(12) United States Patent
Zediker et al.

(10) Patent No.: US 10,001,612 B2
(45) Date of Patent: Jun. 19, 2018

(54) OPTICAL FIBER CABLE FOR TRANSMISSION OF HIGH POWER LASER ENERGY OVER GREAT DISTANCES

(71) Applicant: Foro Energy, Inc., Houston, TX (US)

(72) Inventors: Mark S. Zediker, Castle Rock, CO (US); Charles C. Rinzler, Boston, MA (US); Brian O. Faircloth, Evergreen, CO (US); Joel F. Moxley, Highlands Ranch, CO (US)

(73) Assignee: Foro Energy, Inc., Littleton, CO (US)

( * ) Notice: Subject to any disclaimer, the term of this patent is extended or adjusted under 35 U.S.C. 154(b) by 0 days. days.

(21) Appl. No.: 15/154,718

(22) Filed: May 13, 2016

(65) Prior Publication Data

US 2016/0299304 A1 Oct. 13, 2016

Related U.S. Application Data

(60) Division of application No. 12/706,576, filed on Feb. 16, 2010, now Pat. No. 9,347,271, which is a continuation-in-part of application No. 12/544,136, filed on Aug. 19, 2009, now Pat. No. 8,511,401.

(60) Provisional application No. 61/295,562, filed on Jan. 15, 2010, provisional application No. 61/153,271, filed on Feb. 17, 2009, provisional application No. 61/106,472, filed on Oct. 17, 2008.

(51) Int. Cl.
| | |
|---|---|
| *G02B 6/42* | (2006.01) |
| *E21B 7/14* | (2006.01) |
| *E21B 10/60* | (2006.01) |
| *G02B 6/44* | (2006.01) |
| *E21B 7/15* | (2006.01) |
| *E21B 17/00* | (2006.01) |
| *G02B 6/02* | (2006.01) |

(52) U.S. Cl.
CPC ............. *G02B 6/4296* (2013.01); *E21B 7/14* (2013.01); *E21B 7/15* (2013.01); *E21B 10/60* (2013.01); *E21B 17/00* (2013.01); *G02B 6/02395* (2013.01); *G02B 6/443* (2013.01); *G02B 6/4415* (2013.01); *G02B 6/4436* (2013.01); *G02B 6/4492* (2013.01)

(58) Field of Classification Search
CPC .................................. G02B 6/42; G02B 6/02
USPC ......................................................... 385/102
See application file for complete search history.

(56) References Cited

U.S. PATENT DOCUMENTS

| | | | | |
|---|---|---|---|---|
| 4,676,586 A | * | 6/1987 | Jones et al. ...................... 385/33 |
| 5,093,880 A | * | 3/1992 | Matsuda et al. .............. 385/100 |
| 5,182,785 A | * | 1/1993 | Sayegh et al. ................ 385/128 |
| 5,397,372 A | * | 3/1995 | Partus et al. .................... 65/391 |
| 5,501,385 A | * | 3/1996 | Halpin ............................ 225/96 |
| 5,574,815 A | * | 11/1996 | Kneeland ...................... 385/101 |
| 5,581,385 A | * | 12/1996 | Spitzer et al. .................. 349/58 |
| 5,991,479 A | * | 11/1999 | Kleinerman .................... 385/31 |
| 6,463,198 B1 | * | 10/2002 | Coleman et al. ............. 385/101 |

(Continued)

*Primary Examiner* — Kaveh C Kianni
(74) *Attorney, Agent, or Firm* — Glen P. Belvis; Belvis Law, LLC.

(57) ABSTRACT

There is provided a system and apparatus for the transmission of high power laser energy over great distances without substantial power loss and without the presence of stimulated Raman scattering. There is further provided systems and optical fiber cable configurations and optical fiber structures for the delivering high power laser energy over great distances to a tool or surface to perform an operation or work with the tool or upon the surface.

1 Claim, 6 Drawing Sheets

(56) References Cited

U.S. PATENT DOCUMENTS

| | | | |
|---|---|---|---|
| 6,944,380 B1* | 9/2005 | Hideo et al. | 385/123 |
| 7,099,533 B1* | 8/2006 | Chenard | 385/31 |
| 7,283,714 B1* | 10/2007 | Gapontsev et al. | 385/126 |
| 7,310,466 B2* | 12/2007 | Fink et al. | 385/126 |
| 2002/0028287 A1* | 3/2002 | Kawada et al. | 427/163.1 |
| 2005/0024716 A1* | 2/2005 | Nilsson et al. | 359/341.31 |
| 2006/0005579 A1* | 1/2006 | Jacobsen et al. | 65/392 |
| 2006/0173148 A1* | 8/2006 | Sasaki et al. | 526/319 |
| 2006/0245468 A1* | 11/2006 | Hartog | 374/161 |
| 2006/0257150 A1* | 11/2006 | Tsuchiya et al. | 398/79 |
| 2009/0029842 A1* | 1/2009 | Khrapko et al. | 501/53 |
| 2009/0207485 A1* | 8/2009 | Goto | 359/341.3 |
| 2009/0214154 A1* | 8/2009 | Kashiwagi | 385/12 |
| 2009/0274175 A1* | 11/2009 | Kitabayashi et al. | 372/3 |
| 2009/0324186 A1* | 12/2009 | Goto | 385/127 |
| 2010/0044106 A1* | 2/2010 | Zediker et al. | 175/16 |
| 2010/0114190 A1* | 5/2010 | Bendett et al. | 607/3 |
| 2010/0158457 A1* | 6/2010 | Drozd et al. | 385/113 |
| 2010/0290781 A1* | 11/2010 | Overton et al. | 398/43 |
| 2011/0122644 A1* | 5/2011 | Okuno | 362/553 |
| 2011/0170563 A1* | 7/2011 | Heebner et al. | 372/3 |
| 2012/0239013 A1* | 9/2012 | Islam | 606/3 |

\* cited by examiner

OPTICAL FIBER CABLE FOR TRANSMISSION OF HIGH POWER LASER ENERGY OVER GREAT DISTANCES

This application is a divisional of U.S. application Ser. No. 12/706,576, filed on Feb. 16, 2010, which:

is a continuation-in-part of U.S. patent application Ser. No. 12/544,136, now issued as U.S. Pat. No. 8,511,401, filed Aug. 19, 2009 title Method and Apparatus for Delivering High Power Laser Energy over Long Distances, which claims the benefit of the filing date of Oct. 17, 2008 under 35 § 119(e)(1) of U.S. Provisional Application Ser. No. 61/106,472, titled Transmission of High Optical Power Levels via Optical Fibers for Applications such as Rock Drilling and Power Transmission;

and this application claims the benefit of priority under 35 U.S.C. § 119(e)(1) of the following listed applications: U.S. Provisional Application Ser. No. 61/295,562, filed Jan. 15, 2010, title Optical Fiber Cable for Transmission of High Power Laser Energy Over Great Distances and U.S. Provisional Application Ser. No. 61/153,271, filed Feb. 17, 2009, title Method and Apparatus for an Armored High Power Optical Fiber for Providing Boreholes in the Earth; the entire disclosure of each of the above mentioned regular and provisional patent application are incorporated herein by reference.

This invention was made with Government support under Award DE AR0000044 awarded by the Office of ARPA-E U.S. Department of Energy. The Government has certain rights in this invention.

BACKGROUND OF THE INVENTION

Field of the Invention

The present invention relates to the construction and composition of optical fiber cables and laser systems utilizing such cables that provide for the ability to transmit high power laser energy over great distances, which distances and power transmission levels were heretofore believed to be unobtainable. The present invention further relates to the construction of such cables to withstand harsh environments, in particular, the present invention relates to a unique and novel combination of an optical fiber and a multi-layered structure for such cables.

As used herein, unless specified otherwise "high power laser energy" means a laser beam having at least about 5 kW (kilowatt) of power. As used herein, unless specified otherwise "great distances" means at least about 500 m (meter). As used herein the term "substantial loss of power" and "substantial power loss" means more than about 2.0 dB/km (decibel/kilometer) for a selected wavelength. As used herein the term "substantial power transmission" means at least about 50% transmittance.

Discussion of Related Art

Until the present invention, it was believed that a paradigm existed in that the transmission of high power laser energy over great distances without substantial loss of power was unobtainable. As a consequence, it was further believed that there was no reason to construct, or investigate the composition of, an optical fiber or an optical fiber cable for the transmission of high power laser energy over great distances.

Power loss over long distances occurs in an optical fiber from many sources including: absorption loss, and in particular absorption loss from hydroxyl ions ($OH^-$); Rayleigh scattering; Brillouin scattering; Raman scattering; defects; inclusions; and bending loss. These problems have been documented in the literature.

For example, in the 2006, Crystal Fiber White Paper, titled "Towards 100 kW fiber laser system Scaling up power in fiber lasers for beam combining" it is provided, at page 4, that for stimulated Brillouin scattering (SBS) "the threshold scales as the square of signal mode field diameter (MFD) and inversely with the effective fiber length. Hence, larger core size and short fiber length are desired for power scaling." (emphasis original) In Corning paper, NIST-SOFM 2004, titled "Stimulated Brillouin Scattering: An Overview of Measurements, System Impairments, and Applications" it is provided, at page 1, that "[o]f the three types of scattering events [Rayleigh, Raman and Brillouin] stimulated Brillouin scattering (SBS) is recognized as the dominant optical fiber nonlinearity." (bracketed matter added) The Corning paper, at page 3, goes on to provide that "[t]he output power curve . . . also shows that the signal power becomes depleted beyond a certain input power. This deleterious result will effectively clamp the signal output power, but continue to transfer power to the Stokes (reflected) signal via the electrostrictive process which underlies the stimulated Brillouin phenomenon." Thus, the Corning paper, at page 4, provides that "[s]timuated Brillouin scattering is known to grossly limit the design of several optical transmission systems, amplifiers, and lasers."

Figure 2:
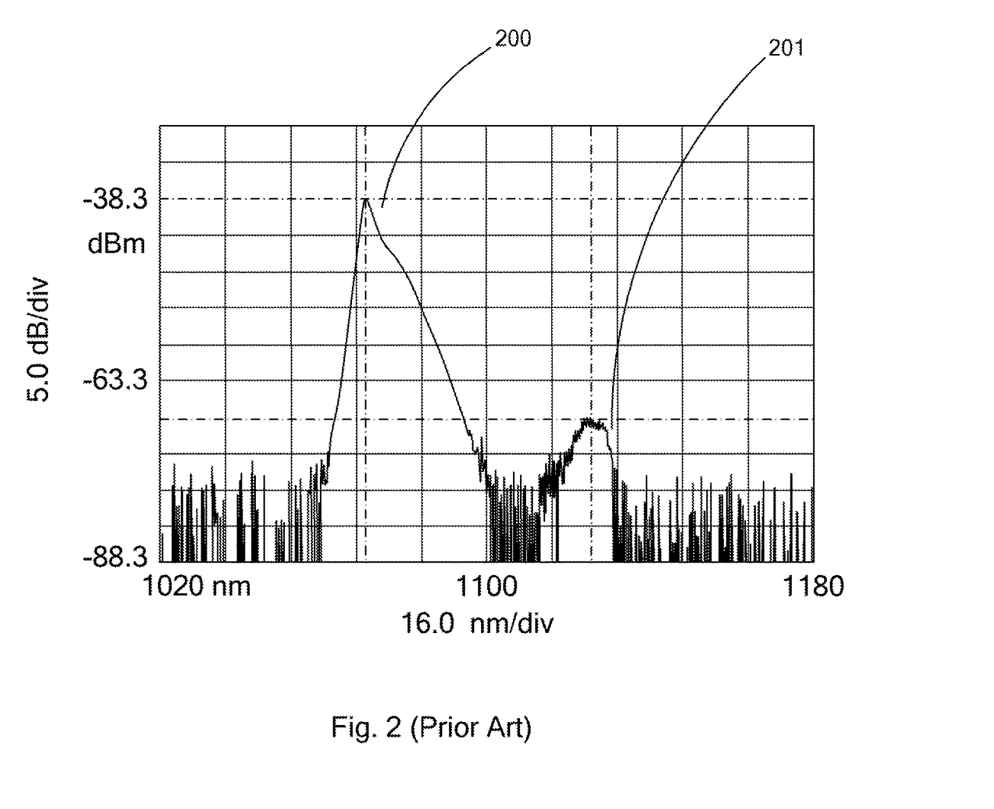
FIG. 2 is a prior art spectrum showing the presence of SRS phenomena.

This perceived paradigm, expressed in the art to be believed to exist between length of fiber and power transmittance is further illustrated in the May 31, 2007, Vol. 5, Supplement, pages S39-S41, CHINESE OPTICS LETTERS, Muto et al., titled "Laser cutting for thick concrete by multi-pass technique", although Muto states that 4 kW of power were delivered down a 1 km fiber, when 5 kW of laser power was put into the fiber, Muto, however, fails to eliminate the stimulated Raman scattering SRS phenomena. As shown by Muto's paper this deleterious phenomenon will effectively clamp the output power as length or power is increased. The SRS phenomenon is seen by the spectrum that is shown in FIG. 3 of Muto, which figure is provided herein as FIG. 2 in this specification. In FIG. 2 the laser beam is shown as band 200 and the SRS is shown as band 201. Thus, prior to the present invention, it was believed that as input laser power, or the length of the fiber increased, the power output of a fiber would not increase because of the SBS, SRS and other nonlinear phenomenon. In particular, SBS would transfer the output power to back up the fiber toward the input. Further, SBS, SRS, as well as the other deleterious nonlinear effects, in addition to limiting the amount of power that can be transmitted out of the fiber, can result in fiber heating and ultimate failure. Thus, as recognized by Muto, at page S41 "[i]t is found that 10-kW power delivery is feasible through a 250-m-long fiber with the core diameter of 150 µm. The physical phenomenon which restricts the transmitted power is SRS." Thus, Muto, as did others before him, failed to deliver high power laser energy over great distances.

The present invention breaks this length-power-paradigm, and advances the art of high power laser delivery beyond this paradigm, by providing an optical fiber cable laser system that overcomes these and other losses, brought about by nonlinear effects, and provides for the transmission of high power laser energy over great distances without substantial power loss.

SUMMARY

It is desirable to have an optical fiber cable that provides for the delivery of high power laser energy over great distances and without substantial power loss. The present invention, among other things, solves this need by providing the articles taught herein.

Thus there is provided herein an optical fiber cable for transmitting high power laser energy over great distances, the cable can have a length that is greater than about 0.5 km, greater than 2 km greater than about 3 km or greater than about 5 km; the cable is a layered structure comprising: a core; a cladding; a coating; a first protective layer; and, a second protective layer, the cable is capable of transmitting laser energy having a power greater than or equal to about 1 kW, about 5 kW or about 10 kW, over the length of the cable with a power loss of less than about 2 dB/km and preferably less than about 1 dB/km and more preferably less than about 0.3 dB/km for a selected wavelength. There is further provided such an optical fiber cable that delivers the laser energy to a tool or surface having a spectrum that is substantially free from SRS phenomena.

A system for delivering high power laser energy to a tool, the system having a high power laser having a power of at least about 1 kW, at least about 5 kW or at least about 10 kW. The system having an optical fiber cable having a core; cladding; coating; and, a first protective layer. The system having a tool. The cable in the system having first and second ends and a length between the first and second end; the length of the cable being greater than 0.5 km, greater than about 1 km, greater than about 2 km, or greater than about 3 km. The first end of the cable being optically associated or connected to the laser and the second end of the cable being associated with and preferably optically associated with or connected to the tool. The laser beam, from at least in part the laser, transmitted in the cable and having a power of at least about 1 kW at the first end of the cable, and, the power loss of the laser beam in the cable from the first end to the second end being less than about 2 dB/km and preferably being less than about 1 db/km and more preferably less than about 0.5 dB/km for a selected wavelength. There is further provided such an optical fiber cable that delivers the laser energy to a tool or surface having a spectrum in which the SRS phenomena is substantially absent.

A spool of optical fiber cable for transmitting laser energy over great distances. The spool having a cable wound around the spool, the cable being capable of being unwound from and wound onto the spool, and thus being rewindable. The cable having a length greater than about 0.5 km, about 1 km, about 2 km or about 3 km and comprising: a core; a cladding; a coating; a first protective layer; and, a second protective layer. The cable is capable of transmitting high power laser energy for its length with a power loss of less than about 2 dB/km and more preferably less than about 1 dB/km and still more preferably less than about 0.5 dB/km and yet more preferably about 0.3 dB/km. The outer diameter of the spool when wound is less than about 6 m to facilitate transporting of the cable by truck.

DESCRIPTION OF THE DRAWINGS AND THE PREFERRED EMBODIMENTS

In general, the present inventions relate to optical fiber structures for transmitting high power laser energy over great distances without substantial loss of power. This invention further relates to the structure of optical fiber cables and, without limitation, the structure of such cables for use in harsh environments.

Figure 1A:
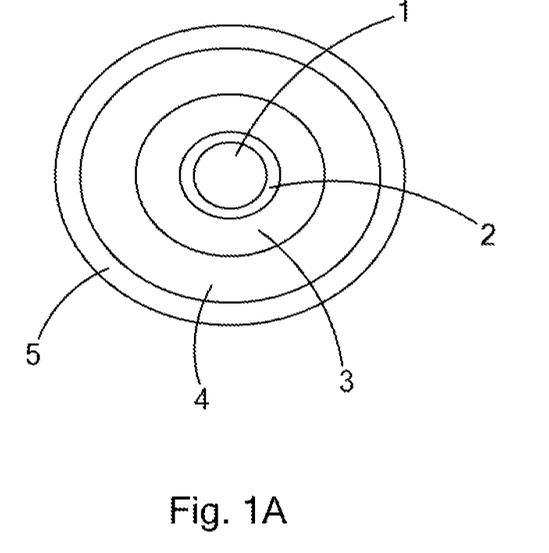
FIG. 1A is a transverse cross sectional view, not necessarily to scale, showing the structure of an optical fiber cable of the present invention.
Figure 1B:
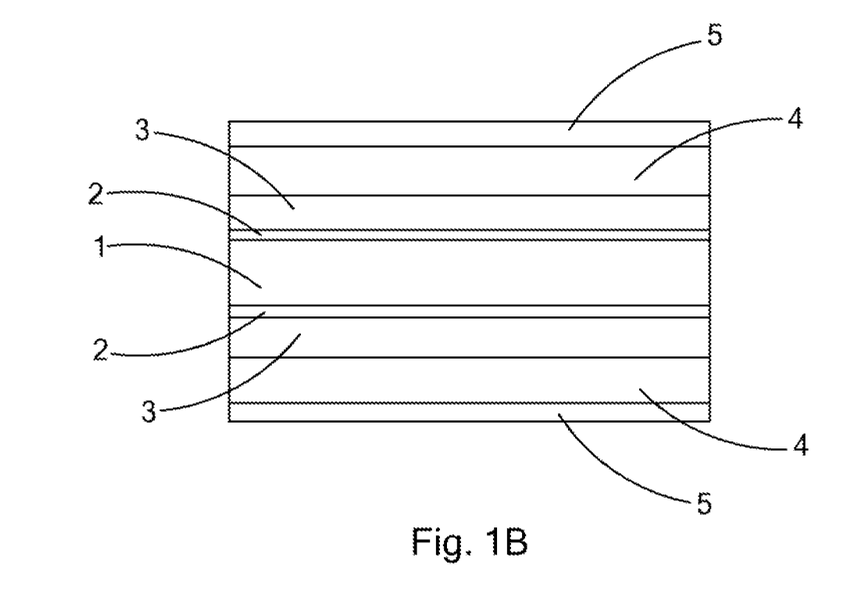
FIG. 1B is a longitudinal cross sectional view of the optical fiber cable of FIG. 1A.

Thus, in general there is provided in FIGS. 1A and 1B an optical fiber cable having a core 1, a cladding 2, a coating 3, a first protective layer 4, and a second protective layer 5. Although shown in the figures as being concentric, it is understood that the components may be located off-center, off-center and on-center at different locations, and that the core, the core and cladding and the core, cladding and coating maybe longer or shorter than the one or more of the protective layers.

The core 1 is preferably composed of fused silica having a water content of at most about 0.25 ppm. The core may be composed of other materials, such as those disclosed in patent application Ser. No. 12/544,136, the entire disclosure of which is incorporated herein by reference. Higher purity materials, and the highest purity material available, for use in the core are preferred. Thus this higher purity material minimizes the scattering losses caused by defects and inclusions. The core is about 200 to about 700 microns in diameter, preferably from about 500 to about 600 microns in diameter and more preferably about 600 microns in diameter. As used herein the term "about" would include ranges of plus or minus 10%.

The cladding 2 is preferably composed of fluorine doped fused silica. The cladding may be composed of other materials such as fused silica doped with index-altering ions (germanium), as well as those disclosed in patent application Ser. No. 12/544,136, the disclosure of which is incorporated herein by reference. The cladding thickness, depending upon the wavelength being used and the core diameter, is from about 50 microns to about 250 microns, preferably about 40 microns to about 70 microns and more preferably about 60 microns. As used herein with respect to a multi-layer structure, the term "thickness" means the distance between the layer's inner diameter and its outer diameter. The thickness of the cladding is dependent upon and relative to the core size and the intended wavelength. In general for 1.1 micron wavelength the outer diameter of the cladding should be 1.1× the outer diameter of core or greater; and, for a 1.5 micron wavelength the outer diameter of the cladding should be 1.5× the outer diameter of the core or greater. Although a single cladding is illustrated, it is understood that multiple cladding may be utilized.

The coating 3 is preferably composed of a high temperature acrylate polymer, for higher temperatures a polyimide coating is desirable. The coating may be composed of other materials, such a metal, as well as those disclosed in patent application Ser. No. 12/544,136, the disclosures of which are incorporated herein by reference. The coating thickness is preferably from about 50 microns to about 250 microns, preferably about 40 microns to about 150 microns and more preferably about 90 microns. The coating thickness may even be thicker for extreme environments, conditions and special uses or it may be thinner for environments and uses that are less demanding. It can be tailored to protect against specific environmental and/or physical risks to the core and cladding that may be encountered and/or anticipated in a specific use for the cable.

The first protective layer 4 and the second protective layer 5 may be the same or they may be different, or they may be a single composite layer comprising different materials. Preferably the first and second protective layers are different materials.

The first protective layer is preferably thixotropic gel. In this preferred embodiment, this layer primarily protects the fiber from absorption loss from hydroxyl ions and vibration. The thixotropic gel protects the fiber from mechanical damage due to vibrations, as well as, provides support for the fiber when hanging vertically because its viscosity increases when it is static. A palladium additive is be added to the thixotropic gel to provide hydrogen scavenging. The hydrogen which diffuses into the fiber may be problematic for Germanium or similar ion doped cores. When using a pure slica doped core, it is less of an effect. The first protective layer may be composed of other materials, such as those disclosed in patent application Ser. No. 12/544,136, the entire disclosure of which is incorporated herein by reference. The thickness of the first protective layer should be selected based upon the environment and conditions of use as well as the desired flexibility and/or stiffness of the cable. Thus, the composition and thickness of the first protective layer can be tailored to protect against specific environmental and/or physical risks to the core, cladding and coating that may be encountered and/or anticipated in a specific use for the cable. Thus, the use of the preferred thixotropic gel provides the dual benefit of adding in the manufacture of the cable as well as providing mechanical protection to the core once the cable manufacturing is completed.

The second protective layer is preferably a stainless steel tube composed of 316 stainless. The second protective layer preferably provides physical strength to the fiber over great distances, as well as, protection from physical damage and the environment in which the cable may be used. The second protective layer may be composed of other materials, such as those disclosed in patent application Ser. No. 12/544,136, the entire disclosure of which is incorporated herein by reference. The second protective layer thickness should be selected based upon the requirements for use and the environment in which the cable will be used. The thickness my further be dependent upon the weight and strength of the material from which it is made. Thus, the thickness and composition of the second protective layer can be tailored to protect against specific environmental and/or physical risks to the core, cladding and coating that may be encountered and/or anticipated in a specific use for the cable.

The optical fiber cables can be greater than about 0.5 km (kilometer), greater than about 1 km, greater than about 2 km, greater than about 3 km, greater than about 4 km and greater than about 5 km. The preferred fibers using the preferred first and second protective layers can withstand temperatures of up to about 300 degrees C., pressures of up to about 3000 psi and as great as 36,000 psi, and corrosive environments over the length of the fiber without substantial loss of power and for extended periods of time. The optical fiber cables can have a power loss, for a given wavelength, of less then about 2.0 dB/km, less than about 1.5 dB/km, less than about 1.0 dB/km, less than about 0.5 dB/km and less than about 0.3 dB/km. The optical fiber cables can have power transmissions of at least about 50%, at least about 60%, at least about 80%, and at least about 90%.

The flexibility and/or stiffness of the cable can be varied based upon the size and types of materials that are used in the various layers of the cable. Thus, depending upon the application a stiffer or more flexible cable may be desirable. It is preferred that the cables have sufficient flexibility and strength to be capable of being repeatedly wound and unwound from a spool or reel having an outside diameter of no more than about 6 meters. This outside diameter spool size can be transported by truck on public highways. Thus, the present invention encompasses a spool or reel having an outside diameter of less than about 6 meters and comprising between 0.5 meters and 5 km of the optical fiber cable of the present invention; a spool or reel having an outside diameter of less than about 6 meters and comprising greater than about 0.5 km (kilometer), greater than about 1 km, greater than about 2 km, greater than about 3 km, greater than about 4 km and greater than about 5 km in length of the optical fiber cable of the present invention.

Any type of high power laser may be used as a source of laser energy for use with the optical fiber cables of the present invention. Examples of such lasers are disclosed in patent application Ser. No. 12/544,136, the disclosures of which are incorporated herein by reference. The composition and construction of the optical fiber cable, and in particular the composition of the core and cladding, should be selected to optimize the reduction in power loss for the particular beam that the laser generates. It is believed that lasers that generate a beam having a wavelength of about 800 nm to about 2000 nm, may see acceptable power loss, i.e., have a benefit, when used with the cables of the present invention. However, wavelengths from about 1060 nm to about 1100 nm and about 1470 nm to about 1600 nm have a greater potential benefit. High power infrared lasers are preferable. At present wavelengths of about 1490 nm, about 1550 nm, and about 1080 nm have even greater potential benefits and are preferred. Further, broad band beams within these wavelength ranges may have greater benefits. Preferably, the laser should generate a laser beam in the infrared wavelength having a power of at least about 1 kW, at least about 3 kW, at least about 5 kW, at least about 10 kW, and at least about 20 kW or greater.

An example of such a preferred laser for use with the optical fiber cables of the present invention is the IPG 20000 YB. The detailed properties of this laser are disclosed in patent application Ser. No. 12/544,136, the disclosures of which are incorporated herein by reference. The preferred laser consists of 20 modules. The gain bandwidth of a fiber laser is on the order of 20 nm, the linewidth of the free oscillator is 3 nm, Full Width Half Maximum (FWHM) and may range from 3 nm to 5 nm (although higher linewidths including 10 nm are envisioned and contemplated). Each module's wavelength is slightly different. The modules further each create a multi-mode beam. Thus, the cumulative effect of combining the beams from the modules is to maintain the Raman gain and the Brillouin gain at a lower value corresponding to the wavelengths and linewidths of the individual modules, and thus, consequently reducing the SBS and SRS phenomenon in the fiber when the combined beams are transmitted through the fiber.

Figure 3:
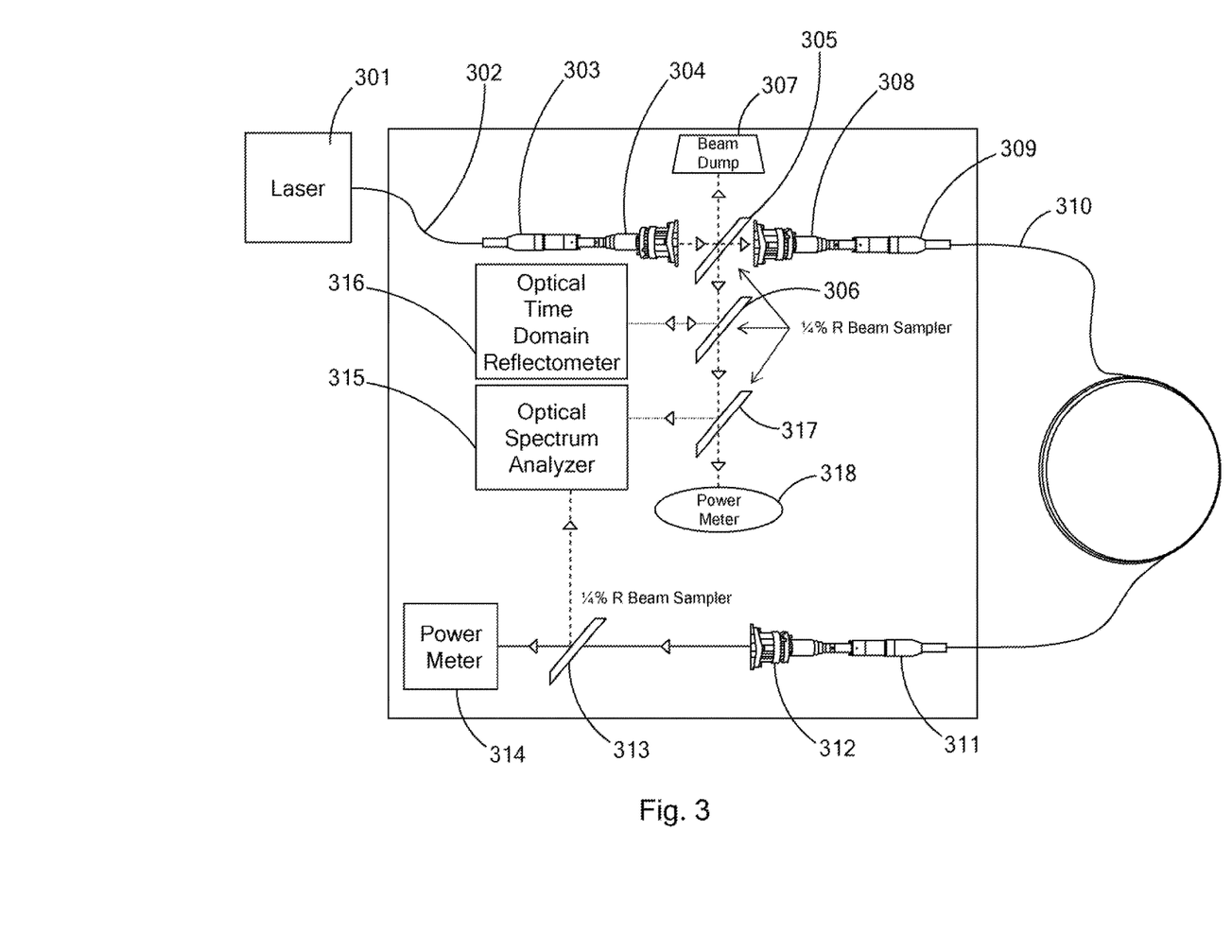
FIG. 3 is a schematic of a testing system.

The testing system of FIG. 3 can be used to evaluate various fibers of the present invention. Thus, there is provided a laser 301, a short, less than about 25 m, 300 μm fiber 302 connecting the laser to a QBH connector 303, which connects the fiber 302 to a collimator 304. The collimator 304 collimates the laser beam and passes the beam through a ¼% beam sampler 305. The beam may be directed at this point in the system to ¼% beam sampler 306, a beam dump 307, or collimator 308. Collimator 308 focuses the beam to input the beam into QBH connector 309. Collimator 308 comprises a focusing lens, a heat sink, and a fiber receptacle. Connector 309 is connected to collimator 308. Connector 309 is affixed to the long test fiber 310. The long test fiber 310 has a QBH connector 311, which connects long test the fiber 310 to a collimator 312. The laser beam travels from collimator 312 to ¼% beam sampler 313. From sampler 313 the beam can travel to a power meter 314 or an optical spectrum analyzer (OSA) 315. Optical time domain reflectometer (OTDR) 316, transmits and receives a timed laser beam through sampler 316, to sampler 305 and then along fiber 310. The OTDR 315 may also be used to test the fiber 310 separate from the laser 301. The laser beam from laser 301 travels from sampler 306 to %% beam sampler 317 and then to either OSA 315 or to power meter 318.

Example 1

An example of an embodiment of the optical fiber cable of the present invention is a fused silica core of about 600 microns diameter, a fluorine doped fused silica cladding, having a thickness of 60 microns, a high temperature Acrylate coating having a thickness of about 90 microns, a thixotropic gel first protective layer having a thickness of about 2500 microns, and a 316 stainless steel second protective layer having an outer diameter of about 6250 microns and a length of about 2 km. The length of the fiber structure comprising the core, cladding and coating is longer than the length of the stainless steel protective layer. This difference in length addresses any differential stretch of the stainless steel relative to the stretch of the fiber structure when the cable is in a hanging position, or under tensions, such as when it is extended down a well bore. The fiber has a numerical aperture of at least about 0.14. The fiber of this example can transmit a laser beam (wavelength 1080 nm) of about 20 kW (kilowatt) power, from the preferred laser, over a distance of about 2 km in temperatures of up to about 200 degrees C. and pressures of about 3000 psi with less than 1 dB/km power loss.

Example 2

An example of an embodiment of the optical fiber cable of the present invention would have a fused silica core of about 500 microns diameter, a fluorine doped fused silica cladding, having a thickness of 50 microns, an Acrylate coating having a thickness of about 60 microns, and an ⅛ inch outer diameter stainless steel protective layer and a length of about 2 km. The fiber has a numerical aperture (NA) of 0.22. The fiber of this example transmitted a laser beam (wavelength 1080 nm) of about 10 kW (kilowatt) power, from the preferred laser, over a distance of about 2 km in temperatures of up to about 150 degrees C. and at ambient pressure and with less than 0.8 dB/km power loss.

Example 3

An example of an embodiment of the optical fiber cable of the present invention is a fused silica core of about 600 microns diameter, a fluorine doped fused silica cladding, having a thickness of 60 microns, a high temperature Acrylate coating having a thickness of about 90 microns, and a ⅛ inch outer diameter stainless steel protective layer and a length of about 0.5 km. The fiber had a numerical aperture of 0.17. The fiber of this example transmitted a laser beam (wavelength 1080 nm) of about 10 kW power from the preferred laser, over a distance of about 0.5 km in temperatures of up to about 200 degrees C. and at ambient pressure and with less than 1 dB/km power loss.

Example 4

The preferred IPG 20000 YB laser was operated a duty cycle of 10% for a 1 kHz pulse rate. The operating conditions for this example were established to keep the pulse duration longer than the time constant for SBS. Thus, the absence of SBS was the result of the fiber and laser, not the pulse duration. The laser beam was transmitted through the 2 km fiber of Example 2, evaluated in a test system along the lines of the test system shown in FIG. 3 and provided the results set forth in Table I, where peak power launched and power output are in watts.

TABLE I

| Peak Power Launched | Peak Power Output | Percentage transmitted |
|---|---|---|
| 924 | 452 | 48.9 |
| 1535 | 864 | 56.3 |
| 1563 | 844 | 54.0 |
| 1660 | 864 | 52.0 |
| 1818 | 970 | 53.3 |
| 1932 | 1045 | 54.1 |
| 2000 | 1100 | 55.0 |
| 2224 | 1153 | 51.8 |
| 2297 | 1216 | 52.9 |
| 2495 | 1250 | 50.1 |
| 2632 | 1329 | 50.5 |
| 2756 | 1421 | 51.6 |
| 3028 | 1592 | 52.6 |
| 3421 | 1816 | 53.1 |
| 3684 | 1987 | 53.9 |
| 3947 | 2105 | 53.3 |
| 4342 | 2263 | 52.1 |
| 4605 | 2382 | 51.7 |
| 4868 | 2487 | 51.1 |

Figure 4:
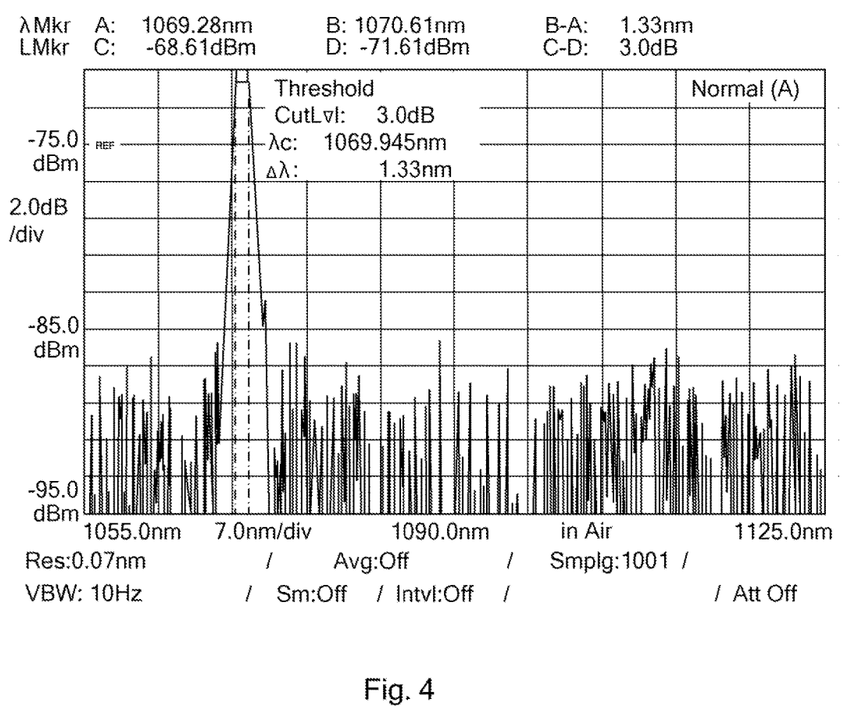
FIGS. 4-6 are spectrums of laser energy transmitted by the present invention showing the absence of SRS phenomena.

The spectrum for 4868 Watt power is shown at FIG. 4. The absence of SRS phenomenon is clearly shown in the spectrum. (As used herein terms such as, "absence of", "without any" or "free from" a particular phenomena or effect means that for all practical purpose the phenomena or effect is not present, and/or not observable by ordinary means used by one of skill in the art) Further the linear relationship of the launch (input) and output power confirms the absence of SBS phenomena. Further, the pulsed operation of the laser may have caused the wavelength of the fiber laser to chirp, which may have further contributed to the suppression of SBS and SRS phenomenon since this would result in an effectively wider laser linewidth.

Example 5

The preferred IPG 20000 YB laser was operated to provide a continuous wave. As set forth below in the table 1, 2, 4 and 6 modules were used. For each power the laser was fired for about 2 minutes and 15 seconds. The laser beam was transmitted through the 2 km fiber of Example 2, evaluated in a test system along the lines of the test system shown in FIG. 3 and provided the results set forth in Tables II, where laser power (input power), and power output are in watts and power throughput is synonymous with transmittance.

TABLE II

| | Laser Setting % | Laser Power Watts | Output of 2 km Fiber Watts | Power Throughput |
|---|---|---|---|---|
| One Module | 10 | 25 | 20 | 80% |
| | 11 | 70 | 52 | 74% |
| | 12 | 80 | 59 | 74% |
| | 13 | 90 | 66.5 | 74% |
| | 14 | 90 | 73.9 | 82% |
| | 15 | 110 | 81.5 | 74% |
| | 16 | 120 | 89.2 | 74% |
| | 17 | 130 | 96.5 | 74% |
| | 18 | 140 | 104.2 | 74% |
| | 19 | 150 | 111.2 | 74% |
| | 20 | 160 | 118.8 | 74% |
| | 21 | 170 | 126.2 | 74% |
| | 22 | 180 | 133.2 | 74% |
| | 23 | 190 | 140.5 | 74% |
| | 24 | 200 | 147.9 | 74% |
| | 25 | 210 | 155.2 | 74% |
| | 26 | 220 | 160.4 | 73% |
| | 27 | 230 | 167.2 | 73% |
| | 28 | 240 | 181 | 75% |
| | 29 | 260 | 177.7 | 68% |
| | 31 | 280 | 191.8 | 69% |
| | 33 | 300 | 206.7 | 69% |
| | 35 | 330 | 221.5 | 67% |
| | 37 | 350 | 236.4 | 68% |
| | 39 | 360 | 250.1 | 69% |
| | 41 | 390 | 263.3 | 68% |
| One Module | 23 | 190 | 120 | 63% |
| | 35 | 330 | 215 | 65% |
| | 41 | 400 | 257 | 64% |
| | 45 | 430 | 288 | 67% |
| | 50 | 490 | 313 | 64% |
| | 55 | 540 | 352 | 65% |
| | 60 | 590 | 382 | 65% |
| | 65 | 640 | 411 | 64% |
| | 70 | 690 | 477 | 69% |
| | 75 | 750 | 493 | 66% |
| | 80 | 800 | 525 | 66% |
| | 85 | 850 | 565 | 66% |
| | 90 | 900 | 599 | 67% |
| | 95 | 950 | 625 | 66% |
| | 100 | 1000 | 647 | 65% |
| Two modules | 50 | 990 | 655 | 66% |
| | 55 | 1100 | 709 | 64% |
| | 60 | 1200 | 820 | 68% |
| | 65 | 1310 | 855 | 65% |
| | 70 | 1410 | 940 | 67% |
| | 75 | 1510 | 1005 | 67% |
| | 80 | 1620 | 1060 | 65% |
| | 85 | 1730 | 1200 | 69% |
| | 90 | 1830 | 1220 | 67% |
| | 95 | 1930 | 1265 | 66% |
| | 100 | 2000 | 1340 | 67% |
| Four Modules | 50 | 1999 | 1310 | 66% |
| | 55 | 2200 | 1460 | 66% |
| | 60 | 2410 | 1588 | 66% |
| | 65 | 2630 | 1740 | 66% |
| | 70 | 2800 | 1852 | 66% |
| | 75 | 3040 | 2000 | 66% |
| | 80 | 3250 | 2130 | 66% |
| | 85 | 3460 | 2290 | 66% |
| | 90 | 3670 | 2430 | 66% |
| | 95 | 3870 | 2535 | 66% |
| | 100 | 4000 | 2675 | 67% |
| Six Modules | 65 | 4040 | 2665 | 66% |
| | 70 | 4350 | 2875 | 66% |
| | 75 | 4650 | 3100 | 67% |
| | 80 | 4930 | 3300 | 67% |

Figure 5:
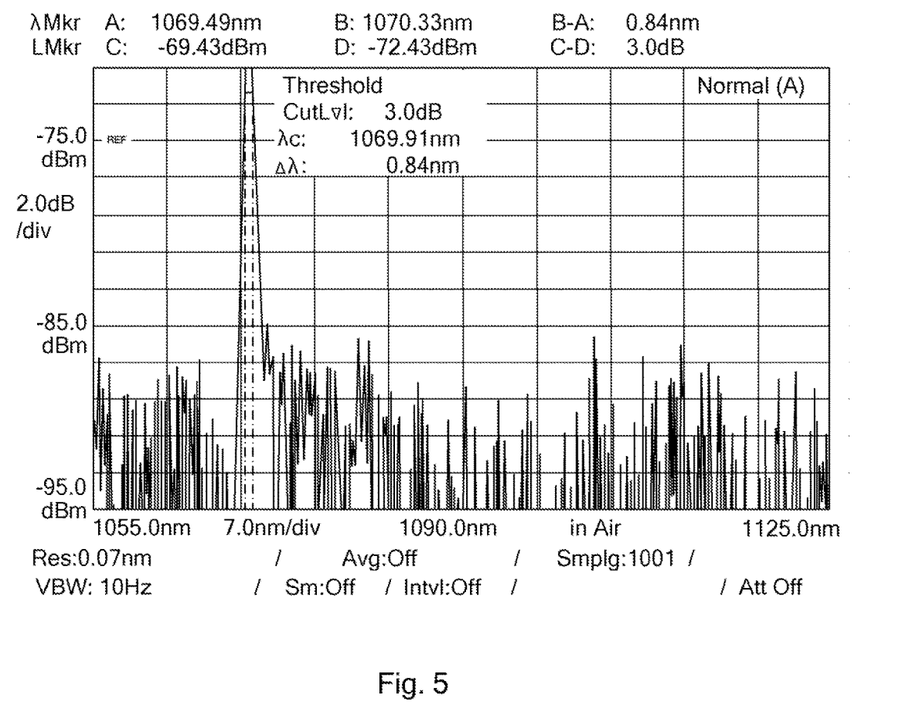

The spectrum for 4 modules at 100% laser setting is shown at FIG. 5. The absence of SRS phenomenon is clearly shown in the spectrum. Further the linear relationship of the input and output power confirms the absence of SBS phenomena.

Example 6

The preferred IPG 20000 YB laser was operated to provide a continuous wave. One module was used. For each power the laser was fired for about 2 minutes and 15 seconds. The laser beam was transmitted through the 0.5 km fiber of Example 3, evaluated in a test system along the lines of the test system shown in FIG. 3 and provided the results set forth in Tables III and IV, where laser power (input power), and power output are in watts and power throughput is synonymous with transmittance.

TABLE III

| Power in (W) | Power out (W) | % Transmission |
|---|---|---|
| 220 | 196 | 89.09% |
| 440 | 380 | 86.36% |
| 660 | 560 | 84.85% |
| 880 | 740 | 84.09% |
| 1000 | 840 | 84.00% |
| 1000 | 860 | 86.00% |
| 1000 | 880 | 88.00% |
| 1000 | 850 | 85.00% |
| 1000 | 850 | 85.00% |
| 1000 | 850 | 85.00% |
| 1000 | 850 | 85.00% |

TABLE IV

| Number of Modules | % laser power | Power in (W) | Power out (W) | % Transmission |
|---|---|---|---|---|
| 1 | 30 | 270 | 253 | 93.70% |
| 1 | 30 | 270 | 244 | 90.37% |
| 1 | 35 | 320 | 300 | 93.75% |
| 1 | 40 | 390 | 370 | 94.87% |
| 1 | 45 | 430 | 390 | 90.70% |
| 1 | 30 | 270 | 247 | 91.48% |
| 5 | 15 | 580 | 520 | 89.66% |
| 5 | 20 | 860 | 770 | 89.53% |
| 5 | 25 | 1140 | 980 | 85.96% |
| 5 | 30 | 1420 | 1230 | 86.62% |
| 5 | 35 | 1700 | 1440 | 84.71% |
| 5 | 40 | 1970 | 1700 | 86.29% |
| 5 | 45 | 2250 | 1910 | 84.89% |
| 5 | 50 | 2520 | 2150 | 85.32% |
| 5 | 55 | 2790 | 2350 | 84.23% |
| 5 | 60 | 3060 | 2600 | 84.97% |
| 5 | 65 | 3320 | 2800 | 84.34% |
| 5 | 70 | 3590 | 3000 | 83.57% |
| 5 | 75 | 3850 | 3200 | 83.12% |
| 5 | 80 | 4120 | 3500 | 84.95% |

Example 7

The preferred IPG 20000 YB laser was operated to provide a continuous wave. As set forth below in the table, 2, 6, 8 and 10 modules were used. For each power the laser was fired for about 2 minutes and 15 seconds. The laser beam was transmitted through the 2 km fiber of Example 2, evaluated in a test system along the lines of the test system shown in FIG. 3 and provided the results set forth in Table V, where laser power (input power), and power output are in watts and power throughput is synonymous with transmittance.

TABLE V

| Modules | Laser Setting % | Laser Power Watts | Output of 2k Fiber Watts | Throughput |
|---|---|---|---|---|
| Two Modules | 10 | 50 | 39 | 78% |
| | 15 | 220 | 162 | 74% |
| | 20 | 330 | 243 | 74% |
| | 25 | 440 | 320 | 73% |
| | 30 | 550 | 420 | 76% |
| | 35 | 660 | 470 | 71% |
| | 40 | 770 | 550 | 71% |
| | 45 | 880 | 650 | 74% |
| | 50 | 990 | 700 | 71% |
| | 55 | 1100 | 770 | 70% |
| | 60 | 1200 | 850 | 71% |
| | 65 | 1310 | 940 | 72% |
| | 70 | 1420 | 990 | 70% |
| | 75 | 1510 | 1070 | 71% |
| | 80 | 1610 | 1130 | 70% |
| | 85 | 1720 | 1200 | 70% |
| | 90 | 1820 | 1290 | 71% |
| | 95 | 1930 | 1370 | 71% |
| | 100 | 2020 | 1420 | 70% |
| Six Modules | 10 | 150 | 130 | 87% |
| | 20 | 1040 | 710 | 68% |
| | 25 | 1380 | 940 | 68% |
| | 30 | 1720 | 1200 | 70% |
| | 35 | 2050 | 1420 | 69% |
| | 40 | 2390 | 1660 | 69% |
| | 45 | 2720 | 1900 | 70% |
| | 50 | 3050 | 2140 | 70% |
| | 55 | 3390 | 2350 | 69% |
| | 60 | 3710 | 2580 | 70% |
| | 65 | 4030 | 2810 | 70% |
| | 70 | 4350 | 3100 | 71% |
| | 75 | 4660 | 3200 | 69% |
| | 80 | 4980 | 3500 | 70% |
| | 85 | 5300 | 3700 | 70% |
| | 90 | 5620 | 3900 | 69% |
| | 95 | 5910 | 4100 | 69% |
| | 100 | 6210 | 4300 | 69% |
| Eight Modules | 40 | 3200 | 2150 | 67% |
| | 45 | 3650 | 2400 | 66% |
| | 50 | 4090 | 2750 | 67% |
| | 55 | 4530 | 3100 | 68% |
| | 60 | 4970 | 3400 | 68% |
| | 65 | 5390 | 3700 | 69% |
| | 70 | 5820 | 4000 | 69% |
| | 75 | 6240 | 4300 | 69% |
| | 80 | 6650 | 4600 | 69% |
| | 85 | 7080 | 4900 | 69% |
| | 90 | 7500 | 5200 | 69% |
| | 95 | 7920 | 5400 | 68% |
| | 100 | 8280 | 5700 | 69% |
| Ten Modules | 10 | 280 | 202 | 72% |
| | 15 | 1190 | 860 | 72% |
| | 20 | 1750 | 1210 | 69% |
| | 25 | 2320 | 1610 | 69% |
| | 30 | 2880 | 1980 | 69% |
| | 35 | 3440 | 2380 | 69% |
| | 40 | 4000 | 2750 | 69% |
| | 45 | 4550 | 3100 | 68% |
| | 50 | 5100 | 3500 | 69% |
| | 55 | 5640 | 3900 | 69% |
| | 60 | 6170 | 4300 | 70% |
| | 65 | 6690 | 4600 | 69% |
| | 70 | 7220 | 5000 | 69% |
| | 75 | 7740 | 5300 | 68% |
| | 80 | 8270 | 5700 | 69% |
| | 85 | 8790 | 6000 | 68% |
| | 90 | 9300 | 6300 | 68% |

Figure 6:
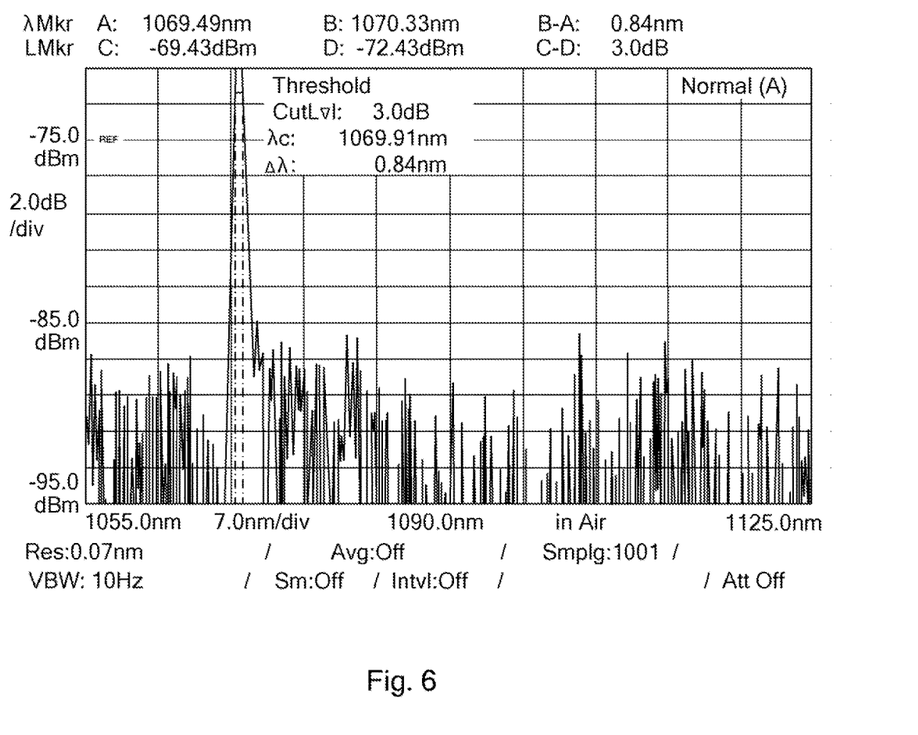

The spectrum for 10 modules at 9300 W output power, 90% laser setting is shown at FIG. 6. The absence of SRS phenomenon is dearly shown in the spectrum. Further the linear relationship of the input and output power confirms the absence of SBS phenomena.

The optical fiber cables of the present invention will have many and varied uses, some of which have yet to be realized. Thus, the optical fiber cables may be used to provide laser energy for use in well known laser tools, such as laser welding and cutting tools. It may be used to provide laser energy for use in newly developed and innovative laser tools, such as laser bottom hole assemblies for advancing boreholes, e.g., patent application Ser. No. 61/247,796 filed Oct. 1, 2009 title Method of Communicating Power and/or Data Though a Mud Motor and Ser. No. 12/544,038 filed Aug. 19, 2009, titled Apparatus for Advancing a Wellbore using High Power Laser Energy. It may be used to provide laser energy for use in the construction of pipelines. Further, the optical fiber cables of the present invention, because of their ability to be constructed of lightweight high strength material and to provide high power over great distances, maybe used to convert and/or create laser mechanical tools and equipment such as tunneling and earth boring and removal machines. Yet further, the cables of the present invention, because of their ability to be constructed of light weight high strength material and to provide high power over great distances, have the capability of being used in any application known or later discovered where the efficient transmission of high power energy over great distances is needed, useful and/or beneficial.

The optical fiber cables of the present invention may further be incorporated into, contained in, or used in conjunction with other tubular and/or wire types of equipments, such as for example, coiled tubing used in the drilling industry, drill pipe used in the drilling industry, and cables used for lowering, raising, holding and connecting equipment. The optical fiber cables of the present invention may be bundled together for a particular application, thus a plurality of cables may be used in a particular application and may be incorporated into, or enclosed within, and/or associated with tubulars, such as coiled tubing, drill pipe, casing and riser used in the drilling industry. Moreover, the optical fiber cables may be connected to each other. Further, a single cable may be connect to, or branched into using switches, several cables. In this way one high power laser may be used to provide high power energy to multiple tools over great distances and/or to provide high power laser energy to multiple tools that are separated by great distances.

Further although the use of single length of fiber, i.e., the length of fiber is made up of one fiber rather than a series of fibers coupled, spliced or other wise optically affixed end to end, for the longer distance power transmission is preferred, the use of multiple lengths of fiber joined end to end may be utilized. Moreover, several lengths of the optical fiber cables, or several lengths of fiber core structures, or combinations of both, many be joined into a plurality of such structures, such as in a bundle of optical fiber cables, fiber core structures or combinations of both.

Thus, the optical fiber cables of the present invention may be used to deliver high power laser energy over great distances to tools or machines, such as welders, cutters, earth boring, earth removal, and material removal equipment, in which the laser energy is then directed by such tools or machines onto a surface, material or work piece. Further, the optical fibers of the present invention may be used to provide operational power, e.g., power to operate a machine or device, over great distances. The optical fibers cables of the present invention can provide high power laser energy over great distances, for such uses, in harsh environments, such as for example in mines, tunnels, boreholes, shipyards, factories, nuclear sites, elevated temperatures, caustic conditions, corrosive conditions, and under water.

From the foregoing description, one skilled in the art can readily ascertain the essential characteristics of this invention, and without departing from the spirit and scope thereof, can make various changes and/or modifications of the invention to adapt it to various usages and conditions.

What is claimed:

1. An optical fiber cable for transmitting high power laser energy over great distances comprising:
   a. a cable having an input end for receiving laser energy and an output end of delivering laser energy to a tool or surface;
   b. the cable having a length between the input end and the output end that is at least about 1 km;
   c. the cable comprising: a core; a cladding; a coating over the cladding; and a means for protection over the coating;
   d. the cable core having a diameter of at least about 400 microns;
   e. the cable input end configured to receive high power laser energy having an input wavelength from a laser having about 15 kW to 50 kW of power; and,
   f. the cable output end configured to deliver the high power laser energy, wherein at least about 70% of the received laser energy is delivered at the input laser wavelength.

* * * * *